(12) United States Patent
Downes et al.

(10) Patent No.: US 8,608,203 B2
(45) Date of Patent: Dec. 17, 2013

(54) SPRAY PREVENTION DEVICE

(75) Inventors: John Anthony Downes, Raby Mere Wirral (GB); David John Knecht, Johnston, OH (US)

(73) Assignee: Spraydown Limited, Auchterarder, Scotland (GB)

( * ) Notice: Subject to any disclaimer, the term of this patent is extended or adjusted under 35 U.S.C. 154(b) by 258 days.

(21) Appl. No.: 13/166,997

(22) Filed: Jun. 23, 2011

(65) Prior Publication Data

US 2011/0248490 A1 Oct. 13, 2011

Related U.S. Application Data

(63) Continuation-in-part of application No. 10/599,623, filed on Jul. 7, 2007, now abandoned.

(30) Foreign Application Priority Data

Apr. 3, 2004 (GB) .................................. 0407653.5

(51) Int. Cl.
*B62D 25/18* (2006.01)

(52) U.S. Cl.
CPC .................................... *B62D 25/18* (2013.01)
USPC ........................................ 280/851; 280/848

(58) Field of Classification Search
CPC ....................................................... B62D 25/18
USPC .......................................... 280/159, 847–851
See application file for complete search history.

(56) References Cited

U.S. PATENT DOCUMENTS

| 3,088,751 | A | * | 5/1963 | Barry et al. | 280/851 |
| 4,192,522 | A | * | 3/1980 | Morgan | 280/851 |
| 4,205,861 | A | * | 6/1980 | Roberts et al. | 280/851 |
| 4,334,694 | A | * | 6/1982 | Iwanicki | 280/851 |
| 4,357,030 | A | * | 11/1982 | Verge | 280/851 |
| 4,382,606 | A | * | 5/1983 | Lightle et al. | 280/851 |
| 4,427,208 | A | * | 1/1984 | Jurges | 280/848 |
| 4,660,846 | A | * | 4/1987 | Morin | 280/851 |
| 4,921,276 | A | * | 5/1990 | Morin | 280/848 |
| 5,022,680 | A | * | 6/1991 | Eklund, Jr. | 280/851 |
| 5,199,742 | A | * | 4/1993 | Gotz et al. | 280/851 |
| 5,207,455 | A | * | 5/1993 | Gotz et al. | 280/848 |

(Continued)

FOREIGN PATENT DOCUMENTS

| EP | 112694 A1 * | 7/1984 | B62D 25/18 |
| EP | 134632 A1 * | 3/1985 | B62D 25/18 |

(Continued)

*Primary Examiner* — John R Olszewski
*Assistant Examiner* — Jacob Meyer
(74) *Attorney, Agent, or Firm* — Greenberg Traurig, LLP (57) ABSTRACT

A device for preventing spray from emerging from the wheels of vehicles comprises a panel (4) that is adapted to be mounted substantially vertically behind a vehicle wheel (3) for receiving on a first side water released by the wheel (3) as it rotates. The panel (4) includes at least one passage (6) which leads from the first side to a rear second side of the panel (4). The or each passage (6) is other than normal to the plane of the panel (4). There is at least one water-collecting pocket (7A, 7B, 7C) along the side of the or each passage (6). In use, air and water enter the or each passage (6) and are separated so that air passes through the or each passage (6) and mixes with ambient air and water collects in the at least one water-collecting pocket (7A, 7B, 7C).

11 Claims, 7 Drawing Sheets

(56) References Cited

U.S. PATENT DOCUMENTS

| | | | |
|---|---|---|---|
| 5,257,822 A * | 11/1993 | Metcalf | 280/851 |
| 5,280,960 A * | 1/1994 | Casey | 280/848 |
| 5,564,750 A * | 10/1996 | Bajorek et al. | 280/851 |
| 5,816,617 A * | 10/1998 | Huang | 280/851 |
| 5,839,761 A * | 11/1998 | Dodt | 280/851 |
| 5,961,148 A * | 10/1999 | Cheng | 280/851 |
| 6,484,984 B2 * | 11/2002 | Hawes | 248/220.21 |
| 6,527,288 B2 * | 3/2003 | Abercrombie | 280/154 |
| 6,799,782 B2 * | 10/2004 | Jain et al. | 280/848 |
| 6,851,717 B1 * | 2/2005 | Andersen | 280/847 |
| 7,316,420 B2 * | 1/2008 | Loddo | 280/851 |
| 2002/0109347 A1 * | 8/2002 | Sheppard | 280/851 |
| 2008/0100053 A1 * | 5/2008 | Kellick | 280/851 |
| 2008/0185809 A1 * | 8/2008 | Archer et al. | 280/154 |

FOREIGN PATENT DOCUMENTS

| | | | | |
|---|---|---|---|---|
| EP | 150588 A1 * | 8/1985 | | B62D 25/18 |
| EP | 425852 A1 * | 5/1991 | | B62D 25/18 |
| FR | 2663596 A1 * | 12/1991 | | B60R 13/07 |
| GB | 2078181 A * | 1/1982 | | B62J 15/04 |
| GB | 2100206 A * | 12/1982 | | B62D 25/18 |
| GB | 2229689 A * | 10/1990 | | B62D 25/18 |
| GB | 2242876 A * | 10/1991 | | B62D 25/16 |
| GB | 2244037 A * | 11/1991 | | B62D 25/18 |

* cited by examiner

SPRAY PREVENTION DEVICE

RELATED APPLICATIONS

This application is a continuation in-part of application Ser. No. 10/599,623, filed Jul. 7, 2007, and claims the benefit and priority therefrom, which was based on a national stage filing under 35 U.S.C. 371 of International Application PCT/GB2005/001292, filed on Apr. 4, 2005, which claims the benefit of Great Britain Application No: 0407653.5, filed on Apr. 3, 2004. The entire teachings of the referenced Application No. 0407653.5 is incorporated herein by reference. International Application PCT/GB2005/001292 was published under PCT Article 21(2) in English.

BACKGROUND OF THE INVENTION

The present invention relates to a device to prevent spray from emerging from the wheels of vehicles travelling along roadways in wet weather.

DESCRIPTION OF RELATING ART INCLUDING INFORMATION DISCLOSED UNDER 37 C.F.R. 1.97 AND 1.98

When vehicles (particularly large vehicles such as lorries) travel along a roadway in wet weather, a spray or mist is generated by the wheels which can seriously impair the vision of drivers of vehicles behind. This is very dangerous and can lead to accidents.

This spray occurs because water on the road is picked up by the rotating tyres and thrown off against the wheel arch. As the water hits the wheel arch, so the water is broken up into small droplets and atomised in the air to create a fine spray or mist. This spray is then ejected sideways out of the wheel arch. In extreme conditions, this spray can be impossible to see through.

It has been known to try and reduce such a spray by lining the rear of a wheel arch with a flap with surface bristles or a mesh which helps to cushion or reduce reflection of the water as it emerges from the wheel. This helps to reduce the break up of water into small particles. This does not however separate the water from the air.

UK Patent Specification 2229689 describes a spray inhibiting wheel guard. This wheel guard is curved to form the rear half of a wheel arch, and consists of a series of longitudinal channels between baffles to guide water out of the wheel arch area and direct it back onto a roadway. It has been found that this arrangement does not work since, when the vehicle is travelling at speed, air is forced into the upper area of the channels creating a back pressure in the channels by travelling down the pockets which prevents the spray from entering the channels.

BRIEF SUMMARY OF THE INVENTION

The present invention seeks to provide a solution to this problem by separating the water from the air in the spray rather than trying to inhibit its formation.

According to the present invention there is provided a device to prevent spray from emerging from the wheels of vehicles travelling along roadways in wet weather, the device comprising a panel for mounting generally vertically behind the wheel of a vehicle to receive on a first side of the panel water released by the wheel as it rotates, the panel including at least one passage which leads from the first side to a rear second side of the panel, the or each passage being other than normal to the plane of the panel, and at least one water-collecting pocket along the side of each passage. In use, air and water enters the or each passage with air passing through the or each passage and being free to enter ambient air on the second side of the panel with water collecting in the or each passage pocket.

Preferably the panel is formed from a plurality of vertical baffles in a side by side relationship with passages formed therebetween. Preferably the vertical baffles are of identical shape. Preferably the baffles overlap one another.

Preferably the panel is substantially planar. Preferably the or each passage is non-linear. Preferably the or each passage has two changes of direction. Preferably pockets are positioned generally at a tangent to the change of direction in the passages.

The or each pockets may be a channel running vertically down the baffles whereby water drains down each channel back onto the roadway. The channels may be generally U-shaped. In one embodiment three pockets are formed on each baffle.

BRIEF DESCRIPTION OF THE SEVERAL VIEWS OF THE DRAWING

The above-mentioned features and objects of the present disclosure will become more apparent with reference to the following description taken in conjunction with the accompanying drawings wherein like reference numerals denote like elements and in which:

FIG. 3 shows a section of FIG. 1 showing in schematic form the flow of air and spray there through;

DESCRIPTION OF THE PREFERRED EMBODIMENT

Figure 1:
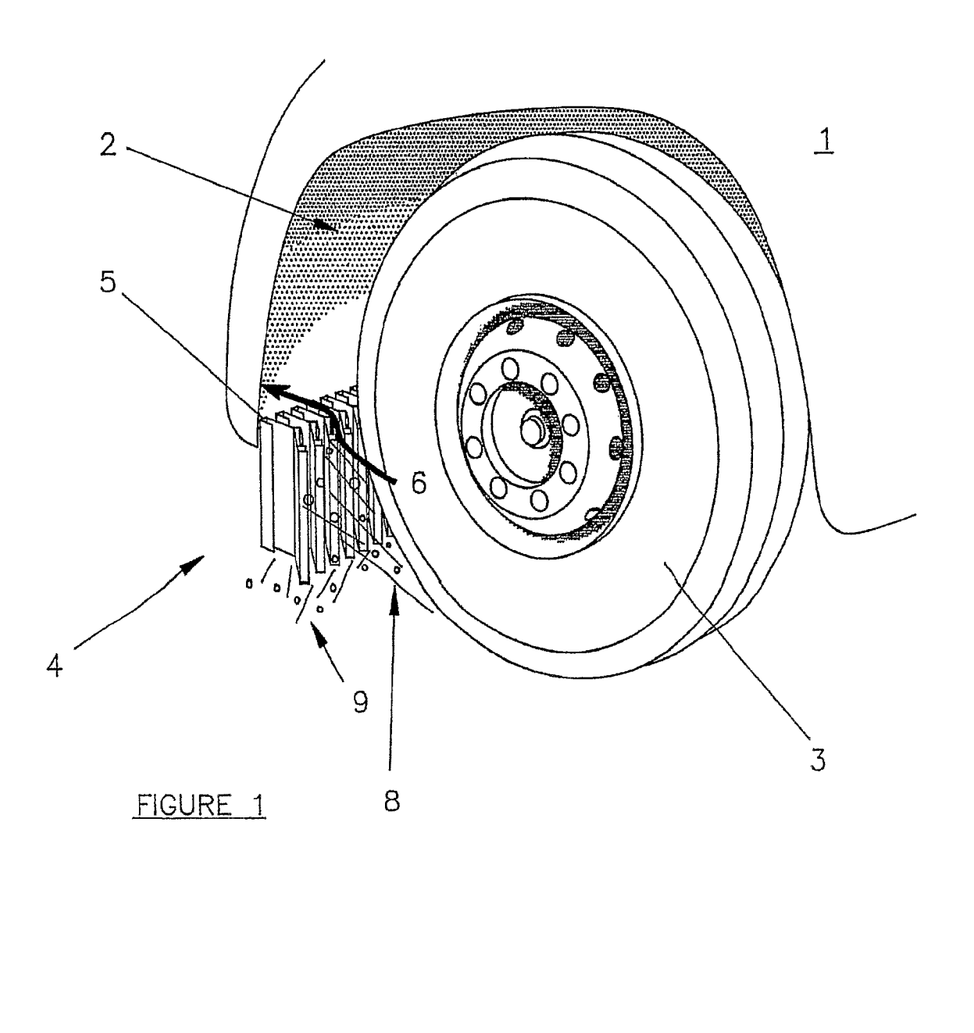
FIG. 1 shows a perspective view of the wheel arch of a road vehicle with the device fitted.

Referring to FIG. 1, there is shown a vehicle 1 with a wheel arch 2 over a wheel 3. Mounted below the wheel arch and between the wheel 3 and wheel arch 2 is a generally planar panel 4 made up from a plurality of identical baffles 5 with passages 6 leading from a first side of the panel through to a second side of the panel as shown more clearly in FIG. 2. Each baffle includes three water-collecting pockets in the form of vertical U-shaped channels 7A, 7B, 7C on the side of the passage 6. In use (as described more fully below) on wet road surfaces, water 8 is thrown up by the wheel onto the first side of the panel 4 and passes with air through the passage 6, but a substantial amount of the water is separated from the air by means of inertial forces and collected by channels 7A, 7B, 7C and falls as a stream of water 9 out of the bottom of the panel.

Figure 2:
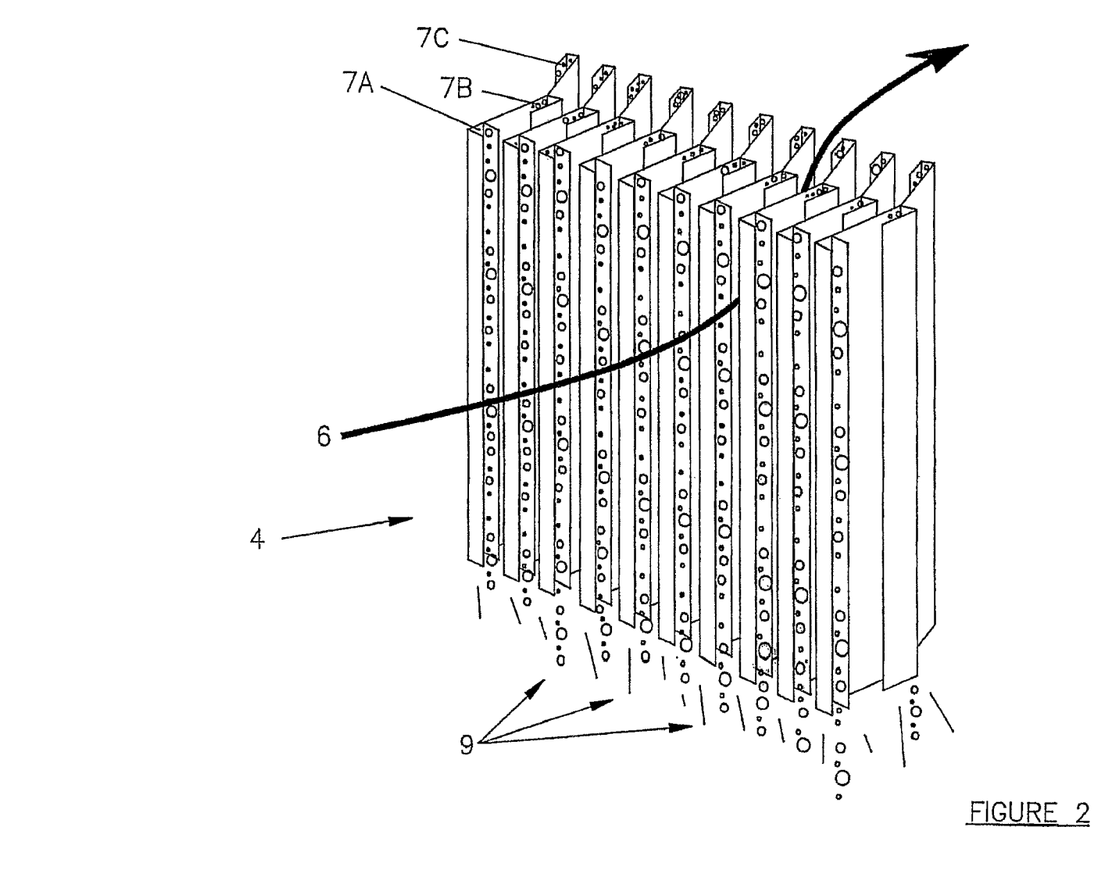
FIG. 2 shows an enlarged view of FIG. 1.
Figure 3:
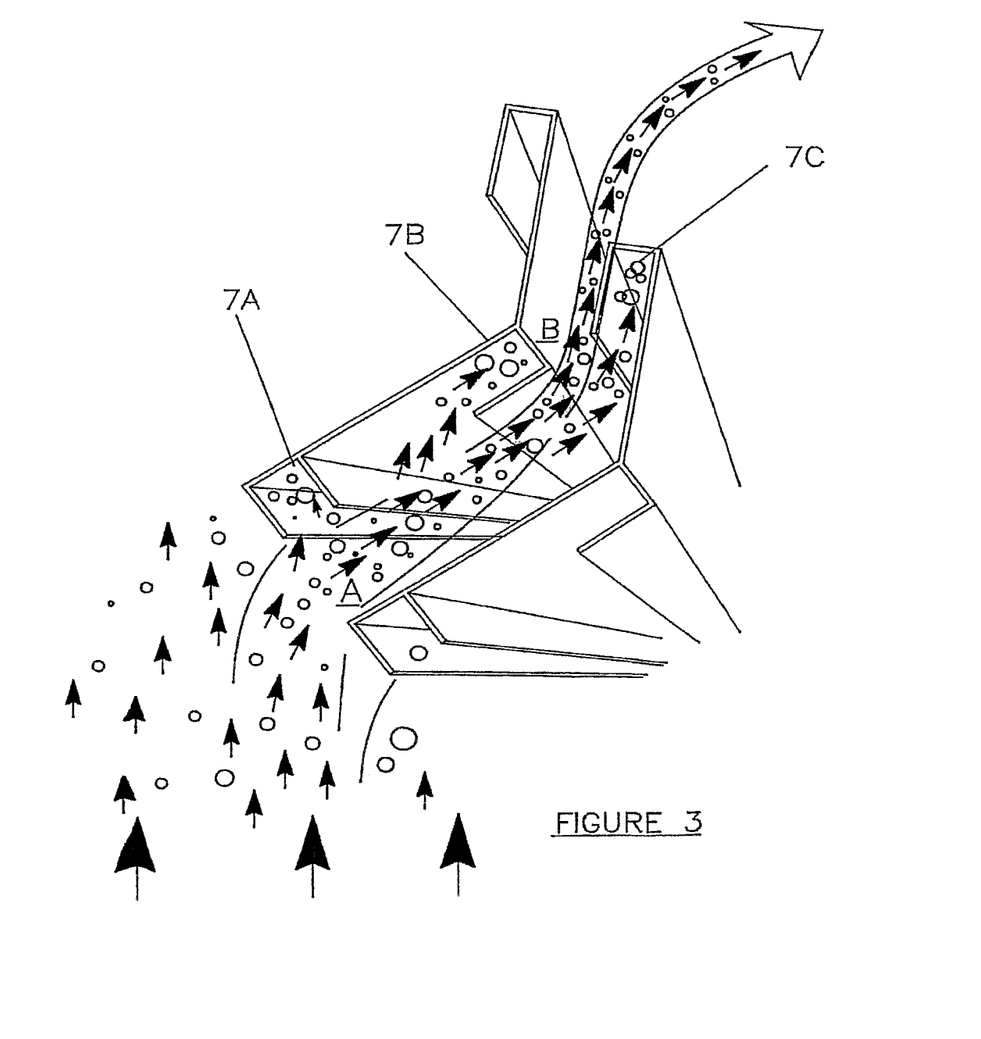

Referring now to FIGS. 2 and 3, it will be seen that the baffles 5 each overlap so that the passage takes a generally curvaceous path through the panel 4, i.e. the passage is not normal to the planes of the panel and is non-linear through the panel. FIG. 3 shows a path of water and air being thrown at two of the baffles. As viewed, the left hand part of the path throws water and air into the first channel 7A where water will collect. The path then changes direction a first time as shown at "A" as it follows the passage 6. As it changes direction, because water is heavier than air, the water particles tend to follow a straight path and leave the air flow at a tangent thereto into pocket 7B located at a tangent to the change of direction of the passage. The path then changes direction a second time as shown at "B" as it exits the passage and much of the water not collected by pocket 7B will leave the air flow at a tangent into pocket 7C located at a tangent to the second change of direction of the passage 6. The air, with much reduced water content exiting the passage 6, is free to mix with ambient air. It has been found that good separation of water from air is achievable.

Figure 4:
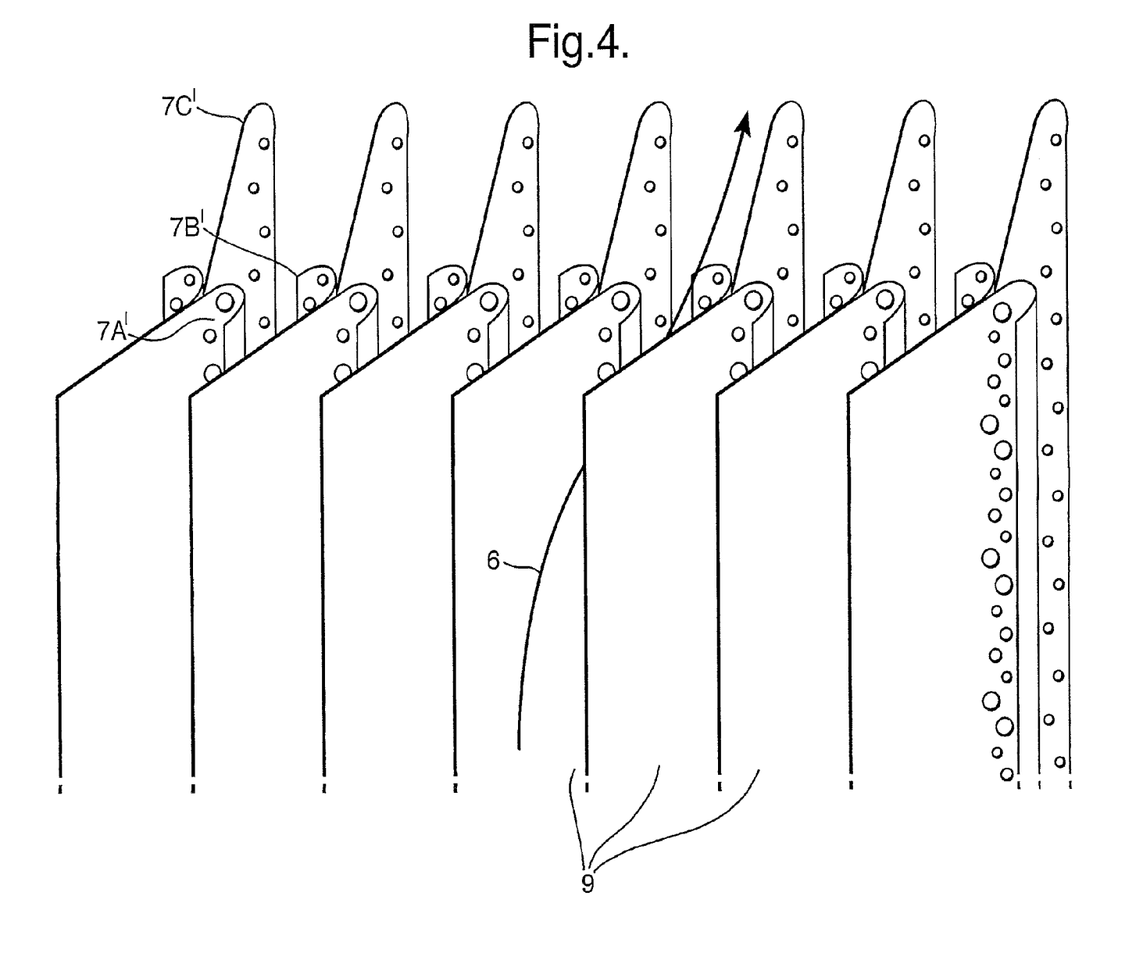
FIG. 4 shows a perspective view of an alternative configuration of the device.
Figure 5:
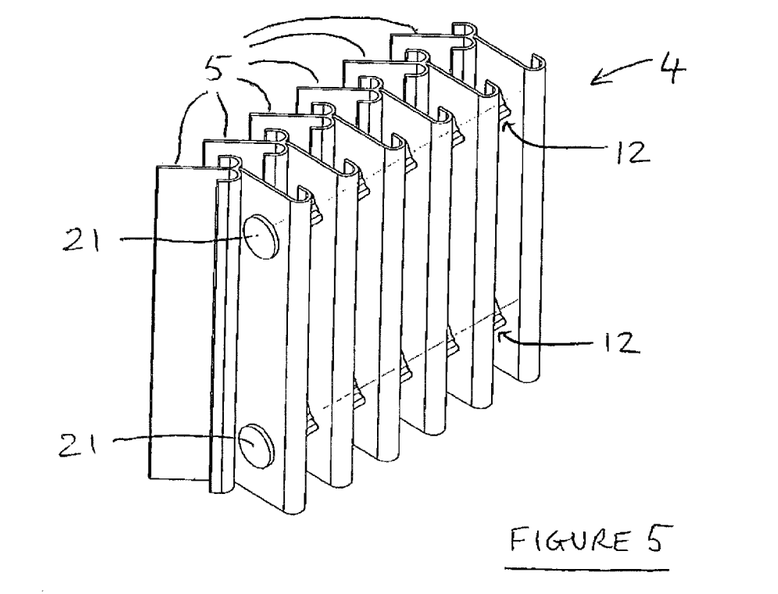
FIG. 5 is a rear perspective view of a device according to the present invention.
Figure 6:
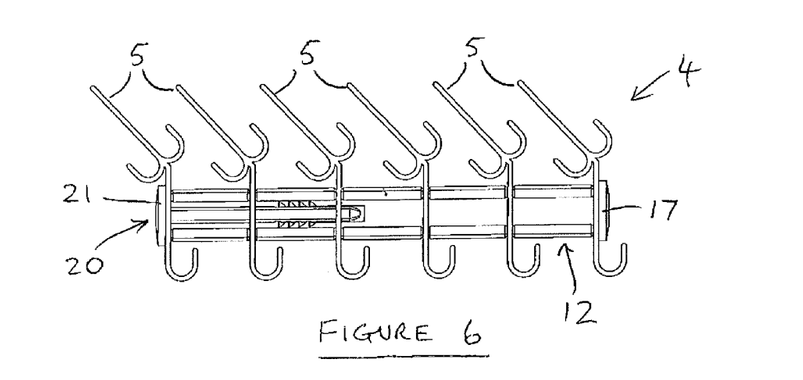
FIG. 6 is a view from above the device shown in FIG. 5.
Figure 7:
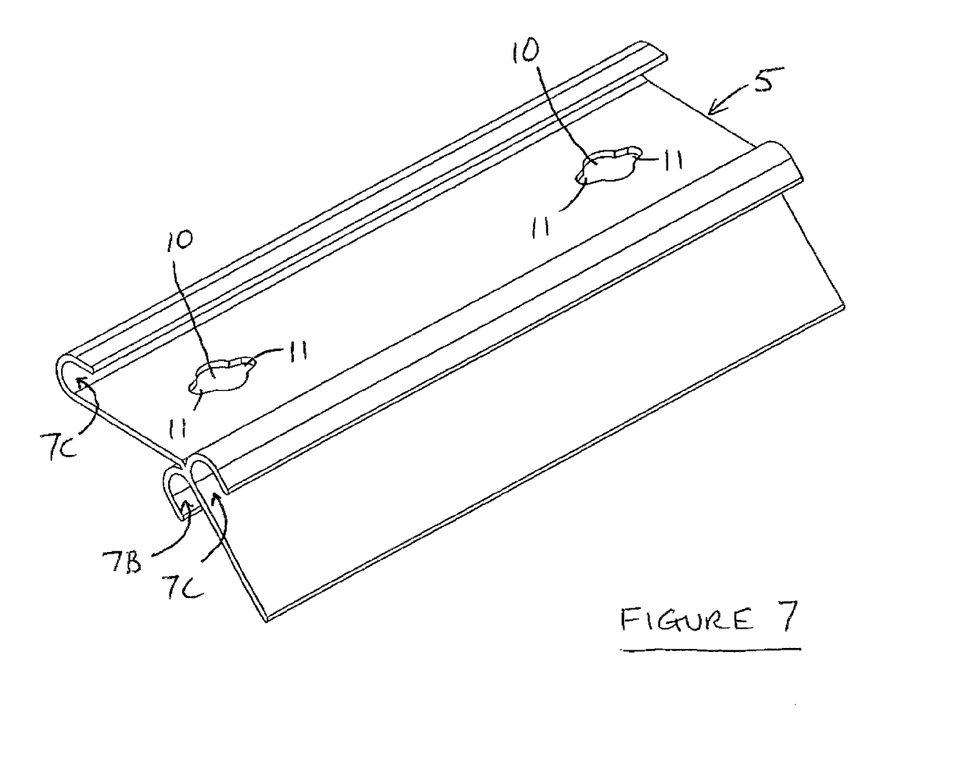
FIG. 7 is a perspective view of a single baffle from the device shown in FIG. 5.
Figure 8:
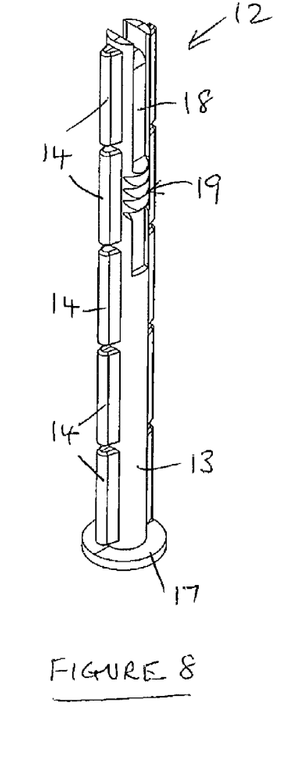
FIG. 8 is a perspective view of an elongate spacer pin used in the device of FIG. 5.
Figure 9:
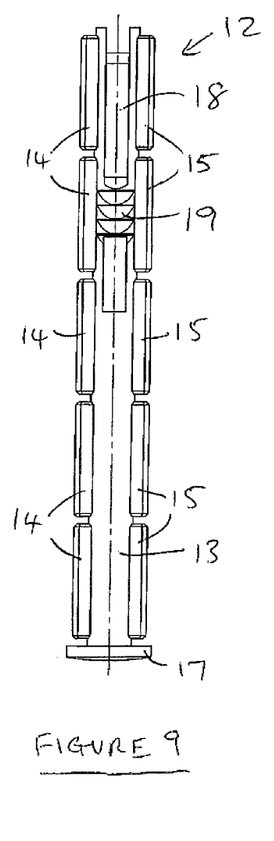
FIG. 9 is a side view of the spacer pin of FIG. 8.
Figure 10:
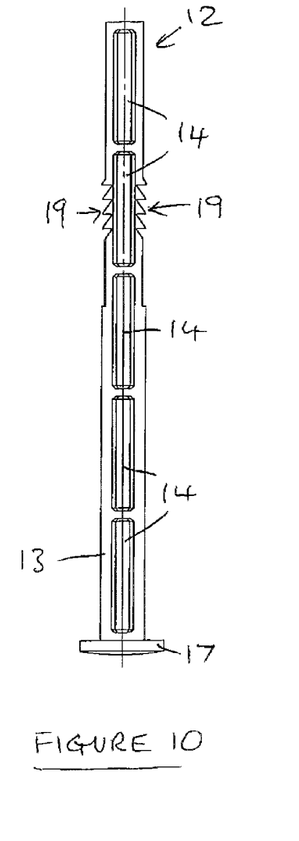
FIG. 10 is a further side view perpendicular to the side view of FIG. 9.

An alternative baffle arrangement is shown in FIG. 4. The U-shaped channels 7A', 7B', 7C' have a rounded profile.

As water and air enter the passage 6, they change direction. The water, being the heavier component, tends to enter channel 7A', while the air flows past. Any water that remains in the flow is caught in turn by channels 7B' and 7C' respectively as the stream is forced to change direction again.

It is envisaged that the panel may take a form different to those specifically described above. For example the passage through the panel may change direction only once or more than twice. The pockets may be other than U-shaped channels. It is envisaged that such a panel may be formed by extruding the baffles, and joining the baffles in side by side relationship, e.g. with elongate horizontal shafts supporting spacers between baffles.

FIGS. 5 to 13 disclose a preferred arrangement for securing a plurality of identical baffles 5. Conveniently the baffles 5 are formed by extrusion then cut to a desired length depending on the size of panel 4 required. In addition, each baffle 5 is formed with a pair of holes 10 in a wall section, each of which holes 10 is generally circular with oppositely disposed lateral extensions 11. Panels 4 incorporating longer lengths of baffle 5 may require more such holes in order to form a panel of sufficient integrity. In a particular series of baffles 5 for a panel, each series of holes 10 is aligned.

An elongate member 12 in the form of a spacer pin is provided for each series of holes 10. The spacer pin 12 has a central shaft 13 which is generally circular in cross-section. The shaft 13 has a series of axially aligned spacers 143 projecting radially from one side and an oppositely disposed series of axially aligned spacers 15 projecting radially from the other side. Adjacent spacers 14 and adjacent spacers 15 are separated by small gaps 16 which are marginally narrower than the thickness of the wall of the baffles 5. The spacer pin 12 also has an enlarged head 17 in the form of an enlarged flange which is too large to pass through the holes 10 and there is a further gap 16 between the head 17 and each of the first spacers 14, 15 adjacent the head 17.

At the opposite end of the central shaft 13 of the spacer pin are oppositely disposed, axially extending, grooves 18 which are disposed circumferentially midway between the oppositely disposed spacers 14, 15. Each groove 18 incorporates serrations 19 at a location along its length.

Figure 11:
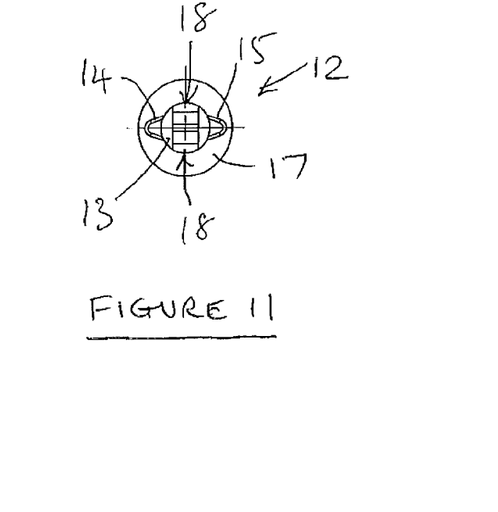
FIG. 11 is an end view of the spacer pin.

The end view of the spacer pin 12 clearly shows the central shaft 13 and the projecting spacers 14, 15 and the holes 10 in the baffles are shaped and sized so as to allow the central shaft 13 and associated spacers 14, 15 of the spacer pin to be inserted. When the baffles 5 are in their correct positions, axially spaced along the spacer pin 12, the spacer pin 12 can be rotated 90° about its lengthwise axis. This engages the edges of the baffles 5 adjacent the holes 10 in the respective gaps 16 with an interference fit such that the baffles are held in their correct axial positions.

Figure 12:
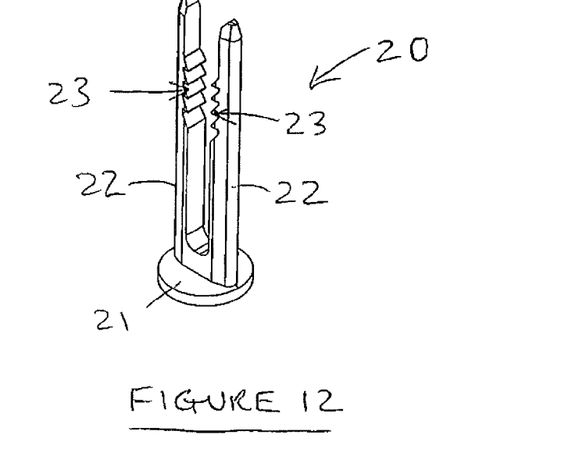
FIG. 12 is a perspective view of a retention pin used in the device of FIG. 5.
Figure 13:
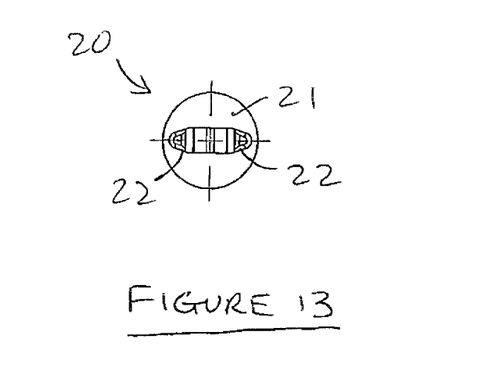
FIG. 13 is an end view of the retention pin shown in FIG. 12.

There is also provided a retaining member 20 in the form of a retention pin which has an enlarged head 21 and a pair of axially extending spaced legs 22 depending therefrom. Each leg 22 has internal serrations 23. The section of each leg 22 of the retention pin 20 is such that when the spacer pin 12 has been rotated through 90° as described above, the legs 22 can be inserted through the hole extensions 11 because the spacers 14, 15 have now moved out of alignment with the hole extensions 11. The legs 22 are spaced apart so as to engage in the oppositely disposed grooves 18 in the central shaft 13 of the spacer pin 12 and the serrations 23 of the legs 22 engage and interlock with the serrations 19 of the spacer pin 12, thereby to lock together the spacer pin 12 and the retention pin with the baffles 5 supported and correctly spaced.

The engagement of the legs 22 in the grooves 18 of the spacer pin and in the hole extensions 11 prevent the spacer pin from rotating and upsetting the spacing of the baffles 5, the endmost baffles 5 being in contact with the respective heads 17, 21 of the spacer pin 12 and retention pin 20. The same process is repeated for the second (and other where provided) series of holes 10 using an additional spacer pin 12/retention pin 20 combination.

There is thus described a device for preventing spray from emerging from a wheel of a vehicle, the device comprising a planar linearly and vertically extending panel mounted vertically behind a vehicle wheel and spaced therefrom for receiving on a first side water released by the wheel as it rotates. The panel includes at least one passage which leads from the first side to a rear second side of the panel, the at least one passage being other than normal to the plane of the panel, and at least one vertically extending water-collecting pocket along a side of the at least one passage, wherein, in use, air and water entering the at least one passage are separated so that air passes through the at least one passage and mixes with ambient air on a second side of the panel, and water collects in the at least one water-collecting pocket.

The panel may be formed from a plurality of vertically extending baffles positioned in a side by side relationship with passages therebetween and the plurality of vertically extending baffles may be substantially identical in shape and overlap one another.

The passage may be non-linear and the water-collecting pockets may be arranged so as to collect water following a change of direction in the at least one passage.

The at least one or each passage may have two changes of direction and the at least one pocket may be a channel running substantially vertically along a respective baffle, so that, in use, water drains from the baffles onto a surface on which the wheel is travelling. This may be substantially U-shaped and the baffles may overlap one another.

The panel is preferably formed from a plurality of vertically extending baffles, the plurality of vertical baffles being extruded joined together in a side by side relationship by horizontally extending shafts supporting spacers between the baffles.

Thus there is described a method for preventing spray from emerging from a wheel of providing a linear and vertically extending planar panel for receiving on a first side water released by the wheel as it rotates, the panel including at least one vertically extending passage which leads from the first side to a rear second side of the panel. The at least one passage being other than normal to the plane of the panel, and at least one water-collecting pocket along a side of the at least one passage, wherein, in use, air and water entering the at least one passage are separated so that air passes through the at least one passage and mixes with ambient air on a second side of the panel, and water collects in the at least one water-collecting pocket. The planar panel is mounted substantially vertically behind a vehicle wheel and spaced therefrom.

The invention contemplates a device for preventing spray from emerging from a wheel of a vehicle, the vehicle having a wheel arch extending over said wheel, the device comprising a planar linearly and vertically extending panel vertically behind and spaced from a vehicle wheel and below the wheel arch for receiving on a first side water released by the wheel as it rotates, the panel including at least one passage which leads from the first side to a rear second side of the panel, and the at least one passage being other than normal to the plan of the panel. At least one vertically extending water-collecting pocket is provided along a side of the at least one passage, wherein, in use, air and water entering the at least one passage are separated so that air passes through the at least one passage and mixes with ambient air on a second side of the panel, and water collects in the at least one water-collecting pocket.

The method disclosed herein prevents spray from emerging from a wheel of a vehicle where has a wheel arch extending over the wheel. A linear and vertically extending planar panel is provided for receiving on a first side water released by the wheel as it rotates, the panel including at least one vertically extending passage which leads from the first side to a rear second side of the panel, the at least one passage being other than normal to the plane of the panel, and at least one water-collecting pocket along a side of the at least one passage. In use, air and water entering the at least one passage are separated so that air passes through the at least one passage and mixes with ambient air on a second side of the panel, and water collects in the at least one water-collecting pocket. The planar panel is mounted vertically behind and spaced from a vehicle wheel and below said wheel arch.

The invention claimed is:

1. A device for preventing spray from emerging from a wheel of a vehicle, the device comprising a planar linearly and vertically extending panel mounted vertically behind a vehicle wheel and spaced therefrom for receiving on a first side water released by the wheel as it rotates, the panel including at least one passage which leads from the first side to a rear second side of the panel, the at least one passage being other than normal to the plane of the panel, and at least one vertically extending water-collecting pocket along a side of the at least one passage, wherein, in use, air and water entering the at least one passage are separated so that air passes through the at least one passage and mixes with ambient air on a second side of the panel, and water collects in the at least one water-collecting pocket, said panel being formed from a plurality of vertically extending baffles, the plurality of vertical baffles being extruded and joined together in a side by side relationship by horizontally extending shafts supporting spacers between the baffles.

2. A device for preventing spray from emerging from a wheel of a vehicle, the device comprising a planar linearly and vertically extending panel mounted vertically behind a vehicle wheel and spaced therefrom for receiving on a first side water released by the wheel as it rotates, the panel including at least one passage which leads from the first side to a rear second side of the panel, the at least one passage being other than normal to the plane of the panel, and at least one vertically extending water-collecting pocket along a side of the at least one passage, wherein, in use, air and water entering the at least one passage are separated so that air passes through the at least one passage and mixes with ambient air on a second side of the panel, and water collects in the at least one water-collecting pocket, said panel being formed from a plurality of vertically extending baffles and the baffles are joined together in a side by side relationship by horizontally extending support means, said support means incorporating spacing means between adjacent baffles.

3. The device as claimed in claim 2 wherein the support means comprise an elongate member which is inserted from one side of the panel through aligned holes formed in each baffle.

4. The device as claimed in claim 3 wherein the elongate member has a central shaft and a series of axially aligned spacers projecting radially therefrom with an axial gap being provided between adjacent spacers, the holes formed in the baffles being shaped to allow insertion of the elongate member such that rotation of the elongate member engages the baffles in the respective gaps between the spacers thereby to space the baffles correctly.

5. The device as claimed in claim 4 wherein the central shaft has a series of axially aligned second spacers projecting radially therefrom, oppositely disposed to the first mentioned spacers but aligned therewith.

6. The device as claimed in claim 5 wherein the central shaft is circular in section and each hole is generally circular but with oppositely disposed extensions for allowing passage of the spacers when aligned.

7. The device as claimed in claim 6 wherein the elongate member has an enlarged flange at one end with axial gaps between the flange and a first pair of said oppositely disposed spacers.

8. The device as claimed in claim 7 wherein a retaining member engages the other end of the elongate member.

9. The device as claimed in claim 8 wherein the retaining member has an enlarged head and a pair of spaced legs depending therefrom, the legs being received through the extensions of the holes in the baffles and engaging in a pair of respective recessed axial grooves formed in the central shaft of the elongate member, the grooves being positioned circumferentially between the oppositely disposed spacers.

10. The device as claimed in claim 9 wherein the legs and the grooves are serrated to effect a positive interlock between the elongate member and the retaining member.

11. The device as claimed in claim 4 wherein the gaps are marginally narrower than the thickness of the baffle so as to effect an interference fit on rotation of the elongate member.

* * * * *